Patented Nov. 12, 1940

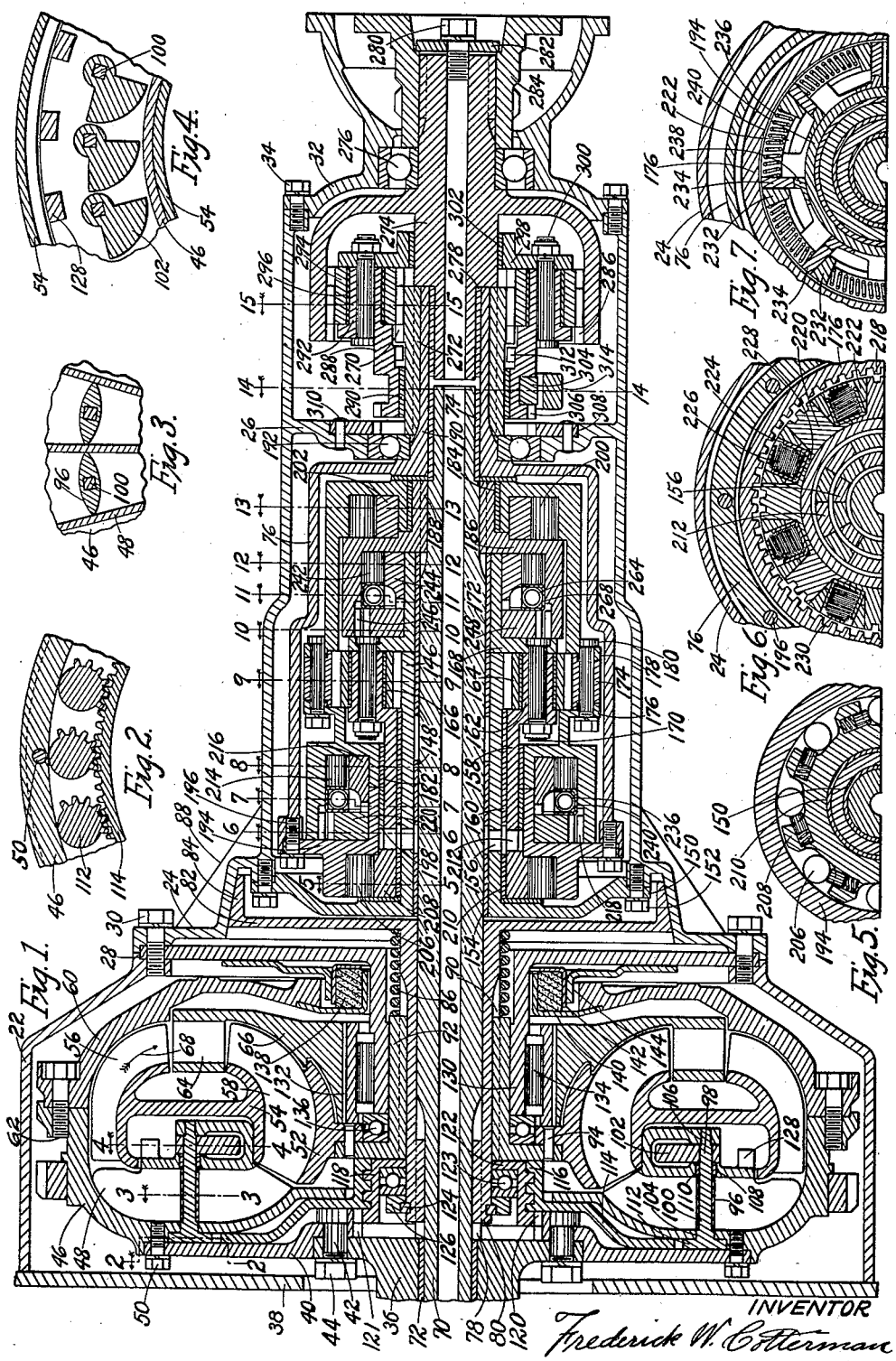

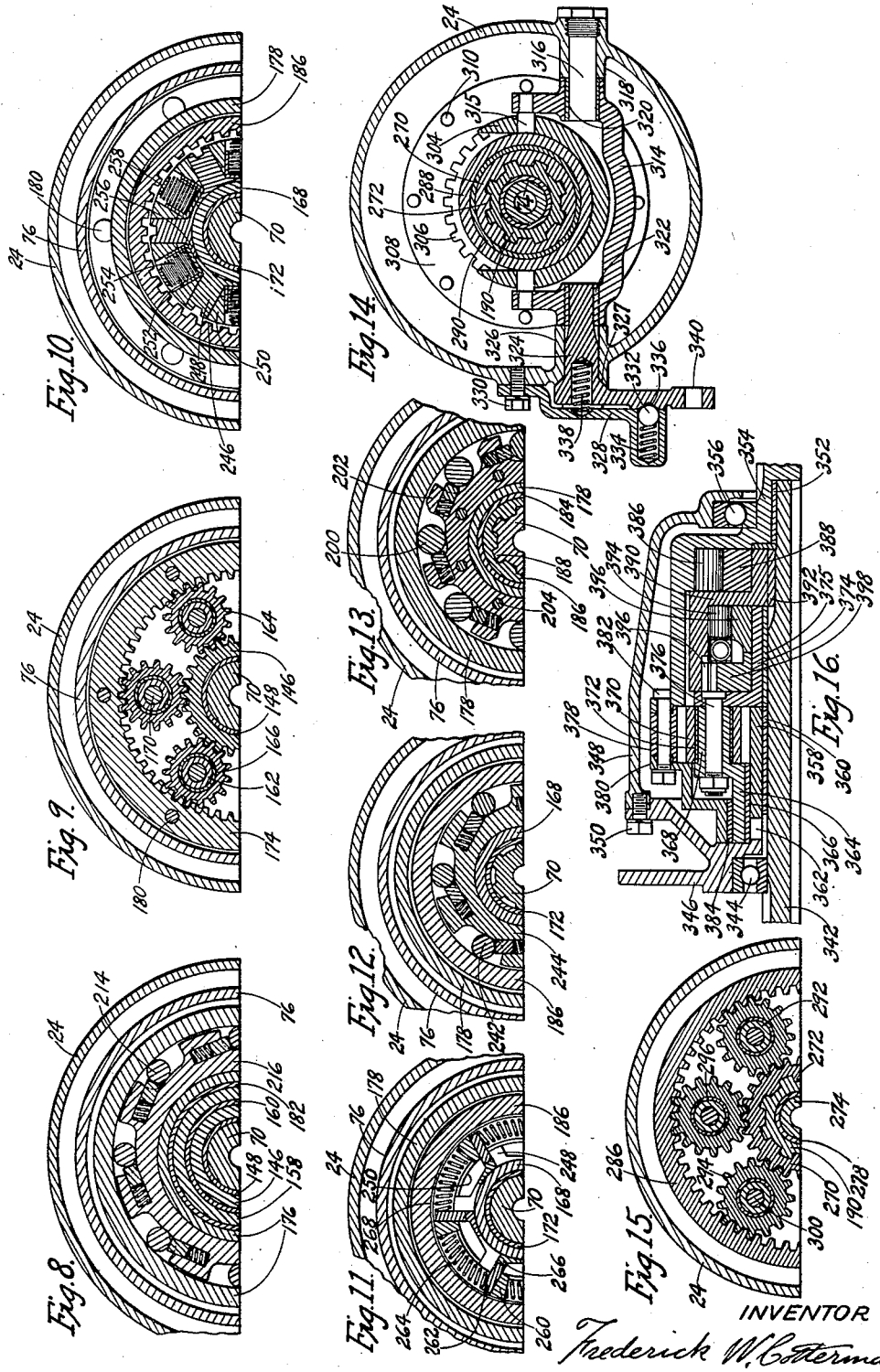

2,221,180

UNITED STATES PATENT OFFICE 2,221,180

AUTOMATIC TRANSMISSION GEAR WITH NO-BACK

Frederick W. Cotterman, Dayton, Ohio, assignor of one-half to Bessie D. Apple, Dayton, Ohio Application December 16, 1937, Serial No. 180,174

25 Claims. (Cl. 74—260)

This invention relates to power transmission mechanism for connecting a driving and driven member in variable speed ratio, and particularly to that type of transmission wherein a turbine is combined with toothed gearing to provide a more extended range. It is particularly adapted to automotive use, and comprises a structure somewhat similar to that shown in my copending applications, Serial No. 142,464, filed May 13, 1937, and Serial No. 148,751, filed June 17, 1937.

The hydraulic unit of the mechanism is of the class which operates both as a fluid clutch and a torque multiplying turbine. It comprises an impeller, a rotor in two stages, and a stator between the stages. The impeller or input member is secured to the engine, the rotor being the output member of the unit.

One of the difficulties with a hydraulic unit of this class is that the functions of clutch and torque multiplier are inconsistent, i. e., in a perfect torque multiplier, the lower the output member speed for a given input member speed the greater the torque multiplication, whereas as a clutch it would be desirable if the impeller, when revolving at the engine idling speed of several hundred R. P. M., would impart zero torque to the rotor.

To obviate this difficulty, in mechanisms of this class, means have been added to restrain the flow of fluid through the impeller by blocking the space between the impeller blades by valves.

These valves are normally closed, but are provided with centrifugal weights which act at a predetermined speed to open the valves. By this means the impeller does not act as an impeller until a considerable engine speed is reached. Below the predetermined speed, therefore, the impeller has better releasing qualities, such as are required of a clutch that is to automatically release when the engine is lowered to its idling speed.

Even when such valves are provided there is still considerable impeller drag on the rotor due to the fact that part of the hydraulic fluid is in the impeller and part in the rotor and there is therefore a tendency for the rotating part of the fluid to adhere to the non-rotating part.

It is therefore an object of this invention to provide a combined hydraulic and geared device of the character described with a brake for holding the rotor stationary against the impeller drag, the brake being operable on and off through a mechanical connection between the impeller valves and the brake, whereby, when the valves open to cause the impeller to become effective to drive the rotor, the brake automatically releases the rotor to be driven, to the end that certain connections which are preferably made to the rotor shaft when it is non-rotative may be effected by bringing the engine to its idling speed.

The gear portion of the mechanism comprises toothed members which must be manually shifted into mesh with each other for forward and reverse gear ratios.

In the hydraulic unit of the character shown, the impeller, rotor and stator cannot be so designed as to be efficient as a torque multiplier over a very wide range of speed, the efficiency as a torque multiplier being highest when the relative speeds of the several members are those for which the mechanism was designed. It follows that, for driving a vehicle the maximum speed of which is more than ten times the minimum, a gear set of rather wide ratio changing capacity is desirable.

In view of the limited speed range within which the hydraulic portion of the unit described is efficient, it is a further object of the invention to provide a gear box whereby, rather than pull the hydraulic unit down to a ratio at which it multiplies torque at low efficiency, a step down in the gear box, i. e., an underdrive is normally operative to allow the hydraulic unit to operate at less reduction between the impeller and rotor for the same engine to wheel ratio, with means to automatically change the gearing for direct drive, and for overdrive as the vehicle speed increases.

In view of the fact that vehicle speeds must vary from 5 to 90 M. P. H., whereas the present internal combustion engines may not be varied efficiently over more than one-fourth this range, it is a further object of this invention to extend the ratio variation through the mechanism by employing gear means and connections therefor, whereby there may be had through the gearing, an underdrive, a direct drive and an overdrive ratio, one or another of which is at all times in series with the hydraulic unit, which being responsive to both speed and torque, will vary by infinitesimal ratio changes depending on similar variations in the balance as between the power applied and the vehicle resistance interposed thereto.

Another object is to so construct and arrange and to so connect the several elements of the gear box that by automatically making a single additional connection between two of the elements, without unmaking any connection already made, a direct drive ratio will result, and by automatically making another single additional connection between two other of the elements, without unmaking any connection already made, an overdrive ratio will result.

Another object is to provide gearing wherein a single planetary gear train has the reaction gear of the train positively and permanently connected to the housing to prevent rotation whereby it is held against backward rotation for underdrive and against forward rotation for overdrive together with means to effect direct drive through the gear mechanism without releasing the reaction gear from its permanent connection.

Another object is to provide a separate reversing gear set, and place it rearward of the underdrive-direct drive-overdrive gear set, in order that no rearward rotation of any part of the latter gear set is ever required, then so arranging the connections of the latter gear set that no part thereof may rotate backwardly, to the end that a no-back connection will exist whereby the vehicle may not move rearwardly except when the reverse connection is in effect in the reverse gear set.

Other objects and advantages will be seen as the invention is described in detail and reference is made to the drawings wherein:

Fig. 1 is a longitudinal, vertical, axial section through the entire mechanism.

Fig. 2 is a fragmentary transverse section taken at 2—2 of Fig. 1, showing part of the mechanism whereby the impeller valves and the rotor brake are compelled to operate in unison.

Fig. 3 is a fragmentary transverse section, taken at 3—3 of Fig. 1, showing several of the impeller blades.

Fig. 4 is a fragmentary transverse section, taken at 4—4 of Fig. 1, showing the centrifugal weights for operating the impeller valves and the rotor brake simultaneously.

Fig. 5 is a partial transverse section, taken at 5—5 of Fig. 1, through a roller clutch by which the planet pinion carrier of the underdrive-direct drive-overdrive gear set may drive the output member forwardly.

Fig. 6 is a partial transverse section taken at 6—6 of Fig. 1, through the centrifugal mechanism provided for changing from underdrive to direct drive ratio.

Fig. 7 is a partial transverse section, taken at 7—7 of Fig. 1, through the unlocking mechanism which permits the adjacent centrifugal mechanism to operate.

Fig. 8 is a partial transverse section, taken at 8—8 of Fig. 1, through a roller clutch by which the output member of the underdrive-direct drive-overdrive gear set may drive the ring gear forwardly to prevent free wheeling, thereby bringing said output member and ring gear to the same speed and simultaneously operating the adjacent unlocking mechanism, whereby the centrifugal mechanism connects said output member and ring gear only when they are rotating at the same speed.

Fig. 9 is a partial transverse section, taken at 9—9 of Fig. 1, through the underdrive-direct drive-overdrive gear set.

Fig. 10 is a partial transverse section, taken at 10—10 of Fig. 1, through the centrifugal mechanism provided for changing from direct drive to overdrive ratio.

Fig. 11 is a partial transverse section, taken at 11—11 of Fig. 1, through the unlocking mechanism which permits the adjacent centrifugal mechanism to operate.

Fig. 12 is a partial transverse section, taken at 12—12 of Fig. 1, through a roller clutch by which the planet pinion carrier of the underdrive-direct drive-overdrive gear set, may drive the rotor shaft which is the input member of the underdrive-direct drive-overdrive gear set forwardly to prevent free wheeling, thereby bringing said carrier and rotor shaft to the same speed and simultaneously operating the adjacent unlocking mechanism whereby the centrifugal mechanism connects said carrier and rotor shaft only when they are rotating at the same speed.

Fig. 13 is a partial transverse section, taken at 13—13 of Fig. 1, through a roller clutch by which the rotor shaft or input member of the underdrive-direct drive-overdrive gear set may drive the ring gear forwardly.

Fig. 14 is a transverse section, taken at 14—14 of Fig. 1, through the manually operable mechanism of the forward-reverse gear set.

Fig. 15 is a partial transverse section, taken at 15—15 of Fig. 1, through the forward-reverse gear set.

Fig. 16 is a partial axial section through a modification of the structure showing how the mechanism may be further simplified when used only as a high-overdrive gear set.

Construction

At the forward end, a housing 22 contains the hydraulic unit. A smaller housing 24 contains the underdrive-direct drive-overdrive gear set and the forward-reverse gear set, the two gear sets being separated by the partition 26. For brevity in description the forward gear set may hereinafter be referred to as the transmission gears and the rearward gear set as the reversing gears. A partition plate 28 is interposed between the housings 22 and 24, the housings and plate being held together by the screws 30. A rear bearing head 32 is secured to the rear end of the housing 24 by the screws 34.

Within the forward section, the crank shaft 36 of an engine 38 has the impeller plate 40 secured thereto by the bolts 42 and nuts 44. The impeller 46 has blades 48 and is secured to the plate 40 by the screws 50.

The rotor comprises a main body 52, a core 54, first stage blades 56 and second stage blades 58. An impeller cover 60 is secured to the impeller 46 by the screws 62. The cover 60 fits as closely around the rotor blades 56 as will permit rotation at different speeds between the two parts.

At the rearward side of the rotor and between the first and second stage blades 56 and 58 are the stator blades 64. The stator blades 64 are supported on the stator body 66, and are so angled that movement of a fluid by the first stage blades 56 toward the second stage blades 58 in the direction of the arrow 68 impinges on the stator blades 64 to drive the rotor forward, by forward being meant clockwise when standing at the left of the drawings.

The rotor shaft 70 has rotative bearing at the forward end in the bearing bushing 72 which is press fitted in the crank shaft 36, and at the rearward end in the bearing bushing 74 which is press fitted in the hub 190 of the transmission output member 76.

The forward end of the rotor shaft 70 has external splines 78 over which the internal splines of the rotor brake hub 80 are axially slidable. At the rear end of the hub 80, the rotor brake flange 82 extends outwardly and carries the cone brake 84 which normally is held in contact with the conical interior of the housing 24 by the spring 86. Ribs 88 on the outside of the housing strengthen the housing and dissipate the slight brake heat generated.

The brake hub 80 has external splines 90 axially slidable in the internal splines of the rotor hub 92. Rotor hub 92 is secured in the rotor body 52 by rivets 94.

Between the impeller blades 48 are the butterfly valves 96. The valve stems 98 are squared at 100 when they pass through the valves 96 and centrifugal weights 102 and rounded at 104 and 106 where they have bearing in the impeller. A center bearing is provided at 108 by means of a collar 110 which is round externally for rotation in the impeller and squared internally to fit the valve stem. Pinion segments 112 are integral with the stems 98 and are in constant mesh with a large but narrow faced gear 114 which has limited rotative movement between the impeller plate 40 and the impeller 46.

The hub of the gear 114 has a coarse pitch multiple internal thread 116 which fits over corresponding external threads on the outside of a collar 118.

At the forward end, the collar 118 has an outwardly extending flange which has external teeth 120 axially slidable in corresponding internal teeth 121 in the impeller plate 40, whereby the collar 118 must always rotate in unison with the impeller but may move axially with respect thereto.

At the rearward end, the collar 118 has an inwardly extending flange 122 against which an antifriction end thrust bearing 123 rests. A split ring 124 extends into an annular groove in the forward end of the brake hub 80, and a collar 126 surrounds the halves of the ring to hold it together.

The thread 116 is such that when the centrifugal weights 102 swing outwardly on the stems 98 until the weights touch the stops 128 and thereby turn the segments 112 to rotate the gear 114, the collar 118 will be drawn forwardly against the resistance of the spring 86 to the rear face of the crank shaft 36, thereby drawing the cone brake 84 well into a disengaged position. Inward swinging of the weights 102 is limited only by engagement of the cone brake 84 with its conical seat in the housing 24. The cone brake is therefore preferably so fitted to its seat in the housing that the weight will swing inwardly slightly less than to the position shown when the cone is new and slightly more than to the position shown when the cone has been in operation a number of years. In this way no adjustment is required.

A long hub 130 extends forwardly from the partition plate 28 and is a close running fit over the rotor hub 92. The stator body 66 is splined over a hub 132 which is internally formed to receive the combination roller bearing and roller brake 134. The hub 130 is externally formed for the combined roller brake and bearing whereby the stator may rotate forwardly but never backwardly.

A thrust bearing 136 holds the rotor to its forward position. A felt seal washer 138 held by retainers 140, 142, and 144, keeps the hydraulic fluid from leaking out into the housing 22. The hydraulic unit is shown as it appears when at rest or when the engine is rotating at idling speed, the valves 96 being closed to render the impeller inoperative as such and the rotor brake 84 being engaged to hold the rotor in a non-rotative state.

Midway of the partitions 26 and 28 in the housing 24 is the transmission gear set which provides underdrive, direct drive and overdrive. The sun gear 146 has bearing bushings 148 press fitted therein, the rotor shaft 70 being runningly fitted in these bushings. A bearing plate 150 is secured to the housing 24 by screws 152, the hub of the bearing plate having press fitted therein the bearing bushing 154. The sun gear 146 and the hub of the bearing plate 150 are end splined together at 156 whereby the sun gear is positively held against rotation at all times.

The planet pinion carrier 158 is provided with a bearing bushing 160 which is rotatable on the hub of the sun gear 146. The carrier has six integral equally spaced hollow studs 162 extending rearwardly for rotatably supporting the planet pinions 164 which are in constant mesh with the sun gear 146. The planet pinions are provided with bearing bushings 166. A carrier rear bearing member 168 is secured to the carrier 158 by bolts 170. The member 168 is provided with a bearing bushing 172 rotatable on the rotor shaft 70.

The ring gear 174 is in constant mesh with the planet pinions 164. Its front bearing member 176 and its rear bearing member 178 are secured to the ring by the bolts 180. The front bearing member 176 is provided with a bearing bushing 182 rotatable on the hub of the carrier 158. The rear bearing member 178 is provided with a bearing bushing 184 rotatable on the hub of the rotor shaft roller clutch member 186 which is drivably connected to the rotor shaft by splines 188.

The output member 76 of the transmission gear set has a rearwardly extending hub 190 rotatable in ball bearing 192 held in the partition 26, the front end being closed by the bearing head 194 secured in place by the screws 196. The bearing head 194 is provided with a bearing bushing 198 rotatable on the hub of the carrier 158.

The ring gear rear bearing member 178 forms the outer ring of a one way roller clutch 200, the inner ring 202 being secured to the rotor shaft roller clutch member 186 by rivets 204 (see Fig. 13), whereby the rotor shaft 70 can in no case rotate forwardly faster than the ring gear 174, although the ring gear may forwardly overrun the rotor shaft.

The output member front bearing head 194 forms the outer ring for a one way roller clutch 206, the inner ring 208 being provided with a bearing bushing 210 rotatable on the hub of the bearing plate 150. The inner ring 208 and the carrier 158 are end splined together at 212. The one way roller clutch 206 is so made that the carrier 158 can in no case rotate forwardly faster than the output member 76, although the output member may forwardly overrun the carrier.

The ring gear front bearing member 176 forms the outer ring for the one way roller clutch 214, the inner ring 216 having limited rotative movement upon the hub of said member. The one way roller clutch 214 is so made that the output member 76 may in no case rotate forwardly faster than the ring gear, although the ring gear may forwardly overrun the output member. The member 176 is also provided at its forward end with the internal teeth 218 which are engageable by corresponding external teeth on the centrifugal weights 220.

Integral lugs 222 (see Fig. 6) extend rearwardly from the bearing head 194 filling the spaces between adjacent weights 220 and forming guides therefor. Each lug 222 is bored through radially so a thimble 224 fits it slidably. Each thimble 224 has a spring 226 which urges it radially inward. The weights have laterally extending ledges 228 upon which the inner ends of the thimbles bear. A dovetail strip 230 is driven into a corresponding groove cut axially across the outer surface of each lug 222 whereby the springs are held under stress in the thimbles.

A smaller integral lug 232 (see Fig. 7) extends rearwardly from each larger lug 222, and an equal number of integral lugs 234 extend forwardly from the inner roller clutch ring 216. Springs 236 are placed between the lugs whereby the lugs 234 are normally seated against the lugs 232.

Integral lugs 238 extend rearwardly from the weights 220 (see Fig. 7) each one radially under a lug 234, whereby the weights 220 may not be moved radially outward by centrifugal force as long as the several lugs are arranged as in Fig. 7.

Two annular cupped stampings 240 provide a housing for the springs 236, the stampings being placed with the open sides of the cups together, the side web of the front stamping being notched to allow the lugs 232 to extend rearwardly therethrough, and the side web of the rear stamping being notched to allow the lugs 234 to extend forwardly therethrough. The spring housing prevents the springs being rubbed by the member 176 which at times rotates at different speeds from the springs.

The rotor shaft roller clutch member 186 forms the outer ring for the one way roller clutch 242, the inner ring 244 having limited rotative movement on the hub of the carrier rear bearing member 168. The one way roller clutch 242 is so made that the carrier member 168 may in no case rotate forwardly faster than the rotor shaft member 186, although the rotor shaft member may forwardly overrun the carrier member. The member 186 is also provided with the internal teeth 246 which are engageable by corresponding external teeth on the centrifugal weights 248.

Integral lugs 250 (see Fig. 10), extend rearwardly from the carrier member 168 filling the spaces between adjacent weights 248 and forming guides therefor. Each lug 250 is bored through radially so a thimble 252 fits it slidably. Each thimble 252 has a spring 254 which urges it radially inward. The weights have laterally extending ledges 256 upon which the inner ends of the thimbles bear. A dovetail strip 258 is driven into a corresponding groove cut axially across the outer surface of each lug 250 whereby the springs are held under stress in the thimbles.

A smaller integral lug 260 (see Fig. 11) extends rearwardly from each larger lug 250, and an equal number of integral lugs 262 extend forwardly from the inner roller clutch ring 244. Springs 264 are placed between the lugs whereby the lugs 262 are normally seated against the lugs 260.

Integral lugs 266 extend rearwardly from the weights 248 (see Fig. 11) each one radially under a lug 262, whereby the weights 248 may not be moved radially outward by centrifugal force as long as the several lugs are arranged as in Fig. 11.

Two annular cupped stampings 268 provide a housing for the springs 264, the stampings being placed with the open sides of the cups together, the side web of the front stamping being notched to allow the lugs 260 to extend rearwardly therethrough, and the side web of the rear stamping being notched to allow the lugs 262 to extend forwardly therethrough. The spring housing prevents the springs being rubbed by the member 186 which at times rotates at different speeds from the springs. That the transmission gear set hereinbefore described functions as a no-back device will hereinafter appear.

The long hub 190 of the output member 76 extends rearwardly into the reversing gear compartment. The reversing sun gear 270 has internal splines 272 which fit corresponding splines on the hub. The tail shaft 274 is rotatably supported at the rear end by the ball bearing 276 held in the bearing head 32, and at the front end by the bearing bushing 278 which is press fitted in the rear end of the hub. The larger diameter of the tail shaft 274 abuts the rear end of the sun gear 270 and therefore prevents the sun gear moving axially.

The ball bearing is held on the tail shaft by the screw 280 acting through intermediate parts 282 and 284. The ring gear 286 is shown integral with the tail shaft 274 but may be made separately and permanently secured thereto.

The reversing planet pinion carrier 288 is provided interiorly with a bearing bushing 290 within which the hub of the sun gear 270 may rotate. Integral hollow studs 292 extend rearwardly to rotatably support the planet pinions 294 in constant mesh with both the sun gear 270 and ring gear 286. The pinions 294 are provided with bearing bushings 296 which are rotatable on the studs 292. A carrier rear bearing member 298 is held to the carrier 288 by the bolts 300. A bearing bushing 302 is press fitted into the member 298 and the tail shaft 274 is rotatable in the bushing.

Near the forward end the carrier 288 is grooved for the shifting collar 304. At the extreme forward end the carrier has external teeth 306 adapted to fit slidably into the internal teeth of the plate 308, the plate 308 being secured to the partition 26 by the rivets 310. The carrier has also the internal teeth 312 adapted to fit slidably over the teeth of the sun gear 270.

A forward and reverse shifting fork 314 (see Fig. 14) has two studs 315 extending radially into openings in the shifting collar 304. One side of fork 314 is swingable on the bearing stud 316 which is screwed into the hub 318 in the housing 24. A bushing 320 is press fitted into the fork and runningly fitted over the stud 316. The other side of the fork is internally splined at 322 for the external splines of the reversing lever 324, which is rotatable in the hub 326 of the housing 24.

A beveled valve like seat 327 in the outer end of the hub 326 and a correspondingly beveled shoulder on the reversing lever 324 is intended to prevent leakage of lubricant from the housing. A detent bracket 328 is held to the housing 24 by screws 330. A detent ball 332 is pressed by a detent spring 334 into seats 336 suitably positioned for forward, neutral and reverse positions of the lever 324. A spring 338 keeps the beveled shoulder of the lever 324 against the beveled seat 327.

The lower end of the lever 324 is provided with a hub 340 to which any suitable operating means may be attached and extended to a position convenient for the operator.

The modification shown in Fig. 16 comprises an input shaft 342 rotatably supported at the forward end by the ball bearing 344 held in a bearing head 346 which is held to the front end of the housing 348 by the screws 350. The rear end of the input shaft 342 is journaled in a bearing bushing 352 press fitted in the output member 354. The output member 354 is rotatably supported at the rear end in the ball bearing 356 held in the housing 348.

A sun gear 358 is interiorly provided with a bearing bushing 360 which is rotatable on the input shaft 342. The sun gear is end splined at 362 to the hub of the bearing head 346 whereby the sun gear is permanently held against rotation. The planet pinion carrier 364 is interiorly provided with a bearing bushing 366 which is rotatable on the hub of the sun gear 358. Integral hollow studs 368 extend rearwardly for rotatably supporting the planet pinions 370, the pinions 370 being provided with bearing bushings 372 which are rotatable on the studs 368.

A carrier rear bearing member 374 is held to the rear ends of the studs 368 by the bolts 376. Member 374 is provided with a bearing bushing 375 which is rotatable on the input shaft 342.

The ring gear 378 together with a front bearing member 380 is secured to the output member 354 by the bolts 382. The bearing member 380 is provided with a bearing bushing 384 which is rotatable on the hub of the carrier 364.

The output member 354 forms the outer ring of a one way roller clutch 386, the inner ring 388 being secured to a roller clutch member 390 by rivets (not shown). The member 390 is secured to the input shaft 342 by splines 392. The roller clutch 386 prevents the input shaft 342 rotating forwardly faster than the ring gear 378, although the ring gear may forwardly overrun the input shaft.

The input shaft roller clutch member 390 forms the outer ring for a one way roller clutch 394, the inner ring 396 having limited rotative movement on the hub of the carrier bearing member 374. The one way roller clutch 394 is so made that the carrier member 374 may in no case rotate forwardly faster than the input shaft member 390, although the member 390 may forwardly overrun the carrier member. The member 390 is also provided with internal teeth 396 which are engageable by corresponding external teeth on the centrifugal weights 398.

The synchronizing mechanism of the modification Fig. 16 is exactly like that shown in Figs. 10 and 11 and described relative to the structure shown in Fig. 1, the modification being therefore adapted to provide a direct-overdrive gear set but not functioning as an underdrive-direct gear set. The mechanism also functions as a no-back as will later appear. This fact renders it unavailable as an overdrive for attaching to the rear end of a conventional sliding gear transmission unless means is provided to neutralize the no-back feature when reversing is to be done.

From the description of the foregoing modification it will be apparent that it was obtained by merely eliminating the clutches 206 and 214 and weights 220 of Fig. 1 together with the underdrive-direct weight locking mechanism shown in Figs. 6 and 7 then connecting the ring gear directly to the output member. It will therefore be readily seen that a modification providing an underdrive-direct gear set without the direct-overdrive feature but wherein the no-back feature will be inherent may be had by merely eliminating the clutches 200 and 242 and weights 248 of Fig. 1 together with the direct-overdrive weight locking mechanism shown in Figs. 10 and 11 then connecting the ring gear directly to the input member.

The mechanism is of course equally applicable to a countershaft gear set as long as there is a one way clutch in series with the gearing between input and output members whereby the input member may drive the output member at a different speed, a second one way clutch whereby the output member may drive the input member at the same speed, centrifugal weights operable to enable the input member to drive the output member at the same speed, and locking means associated with the second said one way clutch and the weights whereby the weights are unlocked for operation whenever said second one way clutch becomes operative.

*Proportion*

While the structure shown may be proportioned for use with any horsepower and vehicle weight within reason, some suggestion as to proportion for a given vehicle may preferably be given.

If the largest diameter of the housing 22 is taken as 15½ inches and the other parts are made to the same scale, the mechanism will be suitable for an engine of around 110 H. P. in a vehicle of approximately 3600 pounds weight.

The transmission gearing is 14 pitch 14 degree pressure angle and 14 degree helix angle. The ring gear has 57 teeth on a pitch diameter of 4.196 inches; the sun gear 27 teeth on a pitch diameter of 1.988 inches; and the planet pinions 15 teeth on a pitch diameter of 1.104 inches. The helix angle of the sun gear is right hand.

The underdrive ratio provided by making the ring gear the driver, the planet pinion carrier the driven, and the sun gear the reaction member, will then be $$\frac{R+S}{R}=\frac{57+27}{57}=1.474$$

input revolutions to 1 output revolution.

The overdrive ratio, provided by making the planet pinion carrier the driver, the ring gear the driven, and the sun gear the reaction member, will then be $$\frac{R}{R+S}=\frac{57}{57+27}=0.6784$$

input revolution to 1 output revolution.

In the reversing gearing where quiet operation and long wear is not the prime consideration a stub tooth design is preferable for strength. The gearing is 12–14 stub tooth, 20 degree pressure angle and straight spur teeth. The ring gear has 54 teeth on a pitch diameter of 4.50 inches; the sun gear 24 teeth on a pitch diameter of 2.00 inches; and the planet pinions 15 teeth on a pitch diameter of 1.25 inches.

The reverse ratio, provided by making the sun gear the driver, the ring gear the driven, and holding the planet pinion carrier non-rotative is then $$\frac{R}{S}=\frac{54}{24}=2.25$$

input revolutions forwardly to 1 output revolution backwardly.

By using a 4⅓ to 1 rear axle, the engine to wheel ratio through underdrive will be 6.39 to 1; through direct 4.33 to 1; through overdrive 2.94 to 1; and through reverse 9.75 to 1. These engine to wheel ratios are those effective when the hydraulic unit is operating at 1 to 1 ratio.

When the ratio through the hydraulic unit is changed, by application of heavy engine power against considerable vehicle resistance to as much as say 2 input to 1 output revolution, the engine to wheel ratio through underdrive will of course be 2×6.39=12.78 to 1, which corresponds substantially to low gear ratio of common practice.

The spring 86 should be made of .162 inch round wire, coiled 2 inch pitch diameter, have 6 active coils and a free length of 6.81 inches. Its stress when in the position shown in the drawings will then be 100 pounds, and with the centrifugal valve operating weights 102 proportioned as shown in the drawings they will swing outwardly at 500 engine R. P. M.

The small springs 226 and 254 are exactly alike and have been assigned different numerals to facilitate description. The springs should be made of $\frac{3}{32}$ inch round wire, coiled $\frac{7}{16}$ inch pitch diameter, have 10 active coils and a free length of 2.26 inches. The tension of each spring is 2.57 pounds when brought to the length shown in the drawings.

The underdrive to direct centrifugal weights 220 will move outwardly against 2.57 pounds resistance at 880 R. P. M. and the direct to overdrive centrifugal weights 248 will move outwardly against 2.57 pounds resistance at 1316 R. P. M. If 30 inch wheels are used with the 4⅓ to 1 axle suggested, the weights 220 and 248 will move outwardly at 18 and 40 M. P. H. respectively.

The springs 264 and 236 should be such as will yield and reduce to at least half their length from the resistance of the engine to being driven against its compression and internal friction by vehicle momentum. Their dimensions may best be found by trial.

Operation

The normal condition of the mechanism, that is, the condition which exists when the engine is at rest or is idling below 500 R. P. M. is that which is shown in the drawings, where the centrifugal weights 102 of the hydraulic unit are in their "in" position, the impeller valves 96 are closed, the rotor brake 84 is applied, the transmission gear set is coupled for underdrive and the reversing gear set is in neutral. In this condition the engine may be speeded up and warmed if desired.

To set the reversing gear set for moving the vehicle backwardly, the hub 340 of the reversing lever 324 is moved rearwardly, which draws the carrier 288 forwardly and engages the carrier clutch teeth 306 with the internal teeth of the clutch plate 308. When the carrier 288 is thus held non-rotative, forward rotation of the sun gear 270 will cause rearward rotation of the ring gear 286 and the vehicle will move backwardly.

For all forward driving, the hub 340 of the reversing lever 324 is drawn forwardly, which pushes the carrier 288 rearwardly until the internal clutch teeth 312 slide over the teeth of the sun gear 270. The teeth of the planet pinions 294, being still meshed one-third their length into the teeth of both the sun gear 270 and ring gear 286, a locked up condition is provided wherein the tail shaft 274 must rotate in unison with the transmission output member 76.

If the engine is now speeded up past 500 R. P. M., the centrifugal weights 102 will swing out against the stops 128, open the valves 96, rotate the gear 114 which will draw the collar 118 forwardly, which will move the rotor brake 84 to the fully disengaged position.

If the power now applied is considerable in proportion to the vehicle resistance, the stator 66 will attempt to rotate rearwardly but will be arrested by the roller brake 134, whereupon the impeller 46 will drive the rotor 52 at reduced speed and increased torque.

The rotor shaft 70 which must always rotate forwardly at rotor speed, drives the ring gear 174 of the transmission gear set forwardly through the roller clutch 200. Since the sun gear 146 is permanently held non-rotative, the rotor revolves forwardly 1.474 turns to 1 carrier turn, driving the output member 76 forwardly at carrier speed through the roller clutch 206. Under these conditions the roller clutches 214 and 242 merely overrun. If the ratio through the torque converter is now, say, 2 to 1 which is within its efficient range, the overall ratio through the device is $2 \times 1.474 = 2.948$. If the suggested 4⅓ to 1 axle is used, the engine to wheel ratio will be $$4\tfrac{1}{3} \times 2.948 = 12.774 \text{ to } 1.$$

This will be low gear. As the vehicle resistance decreases, the hydraulic unit gradually changes to a 1 to 1 drive between impeller and rotor whereupon the engine to wheel ratio becomes 6.387 to 1. This will be second gear.

If, while the above condition maintains, the applied power is sufficiently reduced to cause the vehicle momentum to drive the engine, the transmission output member 76 will drive the ring gear 174 through the roller clutch 214, the ring gear will rotate the carrier through the planet pinions at .6784 carrier revolution to 1 ring gear revolution and the carrier will rotate the rotor shaft at carrier speed through the roller clutch 242. This is engine braking, that is, the prevention of free wheeling. The engine to wheel ratio for this braking is $4\tfrac{1}{3} \times .6784 = 2.94$ to 1. During this braking, the roller clutches 200 and 206 merely overrun.

When the above described engine braking takes place, that is, by driving the engine through the roller clutch 214, the springs 236 yield and allow the lugs 234 to move from over the lugs 238. If the vehicle speed is now anywhere above 18 M. P. H., the centrifugal weights 220 move out and engage the teeth 218 and complete a connection which will enable the ring gear 174 to drive the output member 76 forwardly, a condition which did not before exist. It should be noted that the centrifugal weights 220 were not released to move out and make connection with the teeth 218 until the weights and the teeth were both revolving at the same speed.

If, after the connection between the weights 220 and teeth 218 is made, power is again applied, the drive will be from the rotor shaft 70, through the roller clutch 200 to the ring gear 174 and from the ring gear to the output member 76. The clutches 206 and 242 now overrun and 214 is dormant, the clutch 200 only driving at this time. The gearing now rotates idly under no load as does the countershaft of a conventional sliding gear transmission when in high gear. This is the direct drive connection through the transmission. Whether it will be high gear or second gear will depend on the condition of the hydraulic unit. If sufficiently heavy power is applied to pull the hydraulic unit down to a ratio of as much as 1.474 to 1, the overall ratio will be the same as when the transmission was in underdrive and the hydraulic unit functioning at 1 to 1 ratio.

In any event, when, after the shift up to direct drive in the transmission gear set, speed and load conditions become such that the hydraulic unit assumes a 1 to 1 ratio, the device will be operating in high gear, that is, the engine to wheel ratio will be the axle ratio, namely, 4⅓ to 1.

If, after direct drive has thus been made effective in the transmission gear set, the power is sufficiently decreased to allow the vehicle momentum to drive the engine, the engine braking drive will be from the output member 76 through weights 220 and teeth 218 to the ring gear which drives the carrier 158 through the planet pinions at .6784 times ring gear speed, and the carrier will rotate the rotor shaft through the roller clutch 242. The engine to wheel ratio for braking is again .6784×4⅓=2.94 to 1. During this engine braking, the clutch 242 only is driving, the clutch 214 being dormant and the clutches 200 and 206 overrunning.

When engine braking is made effective as above indicated, that is, by driving the engine through the roller clutch 242, the springs 264 yield and allow the lugs 262 to move from over the lugs 266. If the vehicle speed is now anywhere above 40 M. P. H. the centrifugal weights 248 move out and engage the teeth 246 and complete a connection which will enable the carrier 158 to drive the rotor shaft 70 forwardly, a condition which did not before exist. The centrifugal weights 248 were not unlocked for outward movement until the weights and the teeth to be engaged by the weights were rotating at precisely the same speed.

If, after both the weights 220 and 248 have moved to their "out" position, power is again applied, the drive will be from the rotor shaft 70 through the weights 248 and teeth 246 to the carrier, the carrier driving the ring gear through the planet pinions at 1.474 revolutions of the ring gear to 1 of the carrier, and the ring gear driving the output member 76 through the weights 220 and teeth 218. The clutches 214 and 242 are now dormant and the clutches 200 and 206 overrun. This is the overdrive connection of the transmission gear set, the output member revolutions being 1.474 times the input.

Whether or not this connection is overdrive or high gear will again depend on the condition of the hydraulic unit. If sufficiently heavy power is applied to pull the hydraulic unit down to a ratio of as much as 1.474 to 1, the overall ratio will be the same as when the transmission was in direct drive and the hydraulic unit functioning at 1 to 1 ratio.

When, however, the overdrive connection exists in the transmission gear set and the speed and load conditions become such that the hydraulic unit assumes a 1 to 1 ratio, the device will be operating in overdrive, that is, the engine to wheel ratio will be $$4\tfrac{1}{3} \times \frac{1}{1.474} = 2.94 \text{ to } 1.$$

If, during overdrive connection, engine braking takes place, the drive will be from the output member 76 through the weights 220 and teeth 218 to the ring gear 174 through the planet pinions 164 to the carrier 158 through the weights 248 and teeth 246 to the rotor shaft 70. The clutches 214 and 242 are dormant and the clutches 200 and 206 are overrunning.

It is not intended that the operator of a vehicle having the herein described transmission mechanism must necessarily pay any attention to the ratio in effect, because in normal driving, the power application is quite frequently varied unconsciously to an extent sufficient to cause the vehicle to drive the engine for an instant, and whenever this occurs, if the transmission gear set is not connected for the most desirable ratio, the change to the most desirable ratio will take place without the operator's knowledge. Intermediate the time of the changes in the gearing the hydraulic unit will operate to increase or reduce the overall ratio as speed and load conditions require.

Thus, any time and with any transmission gear ratio effective, a reduction in ratio may be had through the hydraulic unit by the application of heavy power against heavy vehicle resistance if the engine speed has not at that time reached a value which is too near its maximum, in which case the engine could not increase its speed sufficiently to drive the vehicle at the then existing speed through any lower ratio.

The no-back feature of the mechanism is inherent without the addition of any parts, the arrangement of the roller clutches being such that no part in the transmission gear box may rotate backwardly.

Assuming the member 76 rotated backwardly one turn. The carrier must then rotate backwardly one turn because of clutch 206. The ring gear must then rotate backwardly 1.474 turns because of the planet pinions. But if the ring gear rotates backwardly 1.474 turns it must rotate the member 76 backwardly 1.474 turns because of the clutch 214. The member 76 can not rotate itself backwardly 1.474 turns by being rotated 1 turn. The mechanism therefore locks against backward rotation.

If the drive shaft or ring gear is urged to rotate backwardly the same situation as described above takes place because of the clutches 200 and 242. Backward rotation of the ring gear 174 one turn would rotate the rotor shaft 70 backwardly 1 turn because of the clutch 200. Backward rotation of the rotor shaft 70 one turn would rotate the carrier 158 backwardly one turn because of the clutch 242. But the ring gear and carrier are geared together to rotate in the ratio of 1.474 to 1 and can not both revolve one turn at the same time. The structure is therefore locked against backward rotation. It will be seen that the vehicle may move backwardly only when the reverse gear is set for backward rotation, in which case the tail shaft 274 rotates backwardly while the entire transmission gear set rotates forwardly.

I claim:

1. A non-free-wheeling no-back overdrive gear set comprising, an input member, an output member, a planet pinion carrier, planet pinions on said carrier, a non-rotatable reaction gear in mesh with said planet pinions, a driven gear on the output member in mesh with said planet pinions, a one way clutch connecting the input member and output member, whereby the input member may drive the output member forwardly, a second one way clutch connecting the carrier and input member, whereby the carrier may drive the input member forwardly, and speed responsive means on the carrier operable into engagement to connect the input member and carrier, whereby the input member may drive the carrier forwardly.

2. A non-free-wheeling no-back underdrive gear set comprising, an input member, an output member, a planet pinion carrier, planet pinions on said carrier, a non-rotatable reaction gear in mesh with said planet pinions, a driving gear on the input member in mesh with said planet pinions, a one way clutch connecting the carrier and output member, whereby the carrier drives the output member forwardly, a second one way clutch connecting the output member and input member whereby the output member drives the input member forwardly, and means operable into engagement to connect the input member and output member, whereby the input member may drive the output member forwardly.

3. A non-free-wheeling no-back overdrive gear set comprising, an input member, an output member, a planet pinion carrier, planet pinions on said carrier, a non-rotatable reaction gear in mesh with said planet pinions, a driven gear on the output member in mesh with said planet pinions, a one way clutch connecting the input member and output member, whereby the input member may drive the output member forwardly, a second one way clutch connecting the carrier and input member, whereby the carrier may drive the input member forwardly, and centrifugal means on the carrier operable to connect the input member and carrier, whereby the input member may drive the carrier forwardly.

4. A non-free-wheeling no-back underdrive gear set comprising, an input member, an output member, a planet pinion carrier, planet pinions on said carrier, a non-rotatable reaction gear in mesh with said planet pinions, a driving gear on the input member in mesh with said planet pinions, a one way clutch connecting the carrier and output member, whereby the carrier may drive the output member forwardly, a second one way clutch connecting the output member and input member, whereby the output member may drive the input member forwardly, and speed responsive means operable to connect the input member and output member, whereby the input member may drive the output member forwardly.

5. A non-free-wheeling no-back overdrive gear set comprising, an input member, an output member, a planet pinion carrier, planet pinions on said carrier, a non-rotatable reaction gear in mesh with said planet pinions, a driven gear on the output member in mesh with said planet pinions, a one way clutch connecting the input member and output member, whereby the input member may drive the output member forwardly, a second one way clutch connecting the carrier and input member, whereby the carrier may drive the input member forwardly, speed responsive means operable at a predetermined speed to connect the input member and carrier, whereby the input member may drive the carrier forwardly, and locking means associated with said second one way clutch and said speed responsive means normally holding said speed responsive means inoperative above said predetermined speed, but adapted to be released upon the assumption of driving relation by said second one way clutch.

6. A non-free-wheeling no-back underdrive gear set comprising, an input member, an output member, a planet pinion carrier, planet pinions on said carrier, a non-rotatable reaction gear in mesh with said planet pinions, a driving gear on the input member in mesh with said planet pinions, a one way clutch connecting the carrier and output member, whereby the carrier may drive the output member forwardly, a second one way clutch connecting the output member and input member, whereby the output member may drive the input member forwardly, speed responsive means operable at a predetermined speed to connect the input member and output member, whereby the input member may drive the output member forwardly, and locking means associated with said second one way clutch and said speed responsive means normally holding said speed responsive means inoperative above said predetermined speed, but adapted to be released upon the assumption of driving relation by said second one way clutch.

7. A non-free-wheeling no-back overdrive gear set comprising, an input member, an output member, a planet pinion carrier, planet pinions on said carrier, a non-rotatable reaction gear in mesh with said planet pinions, a driven gear on the output member in mesh with said planet pinions, a one way clutch connecting the input member and output member, whereby the input member may drive the output member forwardly, a second one way clutch connecting the carrier and the input member, whereby the carrier may drive the input member forwardly, centrifugal weights operable outwardly at a predetermined speed to connect the input member and carrier, whereby the input member may drive the carrier forwardly, said weights having holding surfaces, holding means on said second one way clutch, normally extending over the weight surfaces, whereby said weights may not move outwardly above said predetermined speed, but adapted upon assumption of driving relation by said second one way clutch to be rotated away from the position over said weight surfaces whereby said weights may move outwardly.

8. A non-free-wheeling no-back underdrive gear set comprising, an input member, an output member, a planet pinion carrier, planet pinions on said carrier, a non-rotatable reaction gear in mesh with said planet pinions, a driving gear on the input member in mesh with said planet pinions, a one way clutch connecting the carrier and output member, whereby the carrier may drive the output member forwardly, a second one way clutch connecting the output member and input member, whereby the output member may drive the input member forwardly, centrifugal weights operable outwardly at a predetermined speed to connect the input member and output member, whereby the input member may drive the output member forwardly, and weights having holding surfaces, holding means on said second one way clutch, normally extending over the weight surfaces, whereby the weights may not move outwardly above said predetermined speed, but adapted upon assumption of driving relation by said second one way clutch to be rotated away from the position radially over said weight surfaces, whereby said weights may move outwardly.

9. A non-free-wheeling no-back overdrive gear set comprising, an input member, an output member, a planet pinion carrier, planet pinions on said carrier, a non-rotatable reaction gear in mesh with said planet pinions, a driven gear on the output member in mesh with said planet pinions, a one way clutch connecting the input member and output member, whereby the input member may drive the output member forwardly, a second one way clutch connecting the carrier and input member, whereby the carrier may drive the input member forwardly, centrifugal weights operable outwardly at a predetermined speed and carrying means engageable upon outward operation to connect the input member and carrier, whereby the input member may drive the carrier forwardly, ledges on said weights, locking lugs on said second one way clutch normally in locked position radially over said weight ledges, resilient means holding said lugs to said locked position, said lugs being adapted to be moved against said resilient means to an unlocked posidrive the rotatable gear forwardly, a fourth one way clutch connecting the carrier and input member, whereby the carrier may drive the input member forwardly, means operable into engagement to connect the rotatable gear and output member, whereby the rotatable gear may drive the output member forwardly, and a second means operable into engagement to connect the input member and carrier, whereby the input member may drive the carrier forwardly.

16. A non-free-wheeling no-back underdrive-direct-overdrive gear set comprising, an input member, an output member, a planet pinion carrier, planet pinions on said carrier, a non-rotatable reaction gear in mesh with said pinions, a rotatable gear in mesh with said pinions, a one way clutch connecting the carrier and output member, whereby the carrier may drive the output member forwardly, a second one way clutch connecting the output member and rotatable gear, whereby the output member may drive the rotatable gear forwardly, a third one way clutch connecting the input member and rotatable gear, whereby the input member may drive the rotatable gear forwardly, a fourth one way clutch connecting the carrier and input member, whereby the carrier may drive the input member forwardly, speed responsive means operable at a predetermined speed to connect the rotatable gear and output member, whereby the rotatable gear may drive the output member forwardly, and a second speed responsive means operable at a higher predetermined speed to connect the input member and carrier, whereby the input member may drive the carrier forwardly.

17. A non-free-wheeling no-back underdrive-direct-overdrive gear set comprising, an input member, an output member, a planet pinion carrier, planet pinions on said carrier, a non-rotatable reaction gear in mesh with said pinions, a rotatable gear in mesh with said pinions, a one way clutch connecting the carrier and output member, whereby the carrier may drive the output member forwardly, a second one way clutch connecting the output member and rotatable gear, whereby the output member may drive the rotatable gear forwardly, a third one way clutch connecting the input member and rotatable gear, whereby the input member may drive the rotatable gear forwardly, a fourth one way clutch connecting the carrier and input member, whereby the carrier may drive the input member forwardly, speed responsive means operable at a certain predetermined speed to connect the rotatable gear and output member, whereby the rotatable gear may drive the output member forwardly, locking means associated with said second one way clutch and said speed responsive means, normally holding said speed responsive means inoperative, but adapted to be released upon assumption of driving relation by said second one way clutch, a second speed responsive means operable at a higher predetermined speed to connect the input member and carrier, whereby the input member may drive the carrier forwardly, and a second locking means associated with said fourth one way clutch and said second speed responsive means, normally holding said second speed responsive means inoperative, but adapted to be released upon the assumption of driving relation by said fourth one way clutch.

18. The structure defined in claim 17 wherein the first speed responsive means and first locking means comprises centrifugal weights operable outwardly at a predetermined speed to connect the input member and output member, whereby the input member may drive the output member forwardly, said weights having holding surfaces, holding means on said second one way clutch, normally extending over the holding surfaces, whereby the weights may not move outwardly above said predetermined speed, but adapted upon assumption of driving relation by said second one way clutch to be rotated away from the position radially over said holding surfaces, and wherein the second speed responsive means and second locking means comprises a second set of centrifugal weights operable outwardly at a higher predetermined speed to connect the input member and carrier, whereby the input member may drive the carrier forwardly, said second set of weights having holding surfaces, holding means on said fourth one way clutch, normally extending over the holding surfaces, whereby said second set of weights may not move outwardly above said higher predetermined speed, but adapted, upon assumption of driving relation by said fourth one way clutch to be rotated away from the position over said holding surfaces whereby said second set of weights may move outwardly.

19. Planetary gearing comprising, a reaction gear fixed against rotation in either direction, a rotatable gear coaxial therewith, a planet pinion in mesh with both said gears, a planet pinion carrier, a means connecting the carrier to drive the output member through which the output member may overrun the carrier, a means connecting the input member to drive the rotatable gear through which the rotatable gear may overrun the input member, a speed responsive clutch engageable to enable the rotatable gear to drive the output member, a second speed responsive clutch engageable to enable the input member to drive the carrier, and a locking device operative to hold the first said speed responsive clutch from engaging until said output member attempts to overrun said rotatable gear.

20. The structure defined in claim 19 with a second locking device operative to hold the second said speed responsive clutch from engaging until said carrier attempts to overrun said input member.

21. Transmission gearing comprising, an input member, an output member, a carrier, planet pinions on said carrier, a nonrotatable reaction gear in mesh with said pinions, a gear on the output member in mesh with said pinions, clutch means whereby the input member may drive the output member, a speed responsive clutch for connecting said members through said gearing, a lock to hold said speed responsive clutch disengaged, and means responsive to torque transmitted by the driven member to the driving member through said gearing to release said lock.

22. Transmission gearing comprising, an input member, an output member, a carrier, planet pinions on said carrier, a nonrotatable reaction gear in mesh with said pinions, a gear on the output member in mesh with said pinions, clutch means engageable for driving the output member with the input member, a one way drive clutch means whereby the output member may drive the input member through said gearing, a speed responsive clutch for connecting said members for two way driving, a lock for holding said speed responsive clutch disengaged, and means responsive to torque transmitted by the driven member to the driving member through tion upon assumption of driving relation by said second one way clutch.

10. A non-free-wheeling no-back underdrive gear set comprising, an input member, an output member, a planet pinion carrier, planet pinions on said carrier, a non-rotatable reaction gear in mesh with said planet pinions, a driving gear on the input member in mesh with said planet pinions, a one way clutch connecting the carrier and output member, whereby the carrier may drive the output member forwardly, a second one way clutch connecting the output member and input member, whereby the output member may drive the input member forwardly, centrifugal weights operable outwardly at a predetermined speed and carrying means engageable upon outward operation to connect the input member and output member, whereby the input member may drive the output member forwardly, ledges on said weights, locking lugs on said second one way clutch normally in locked position radially over said weight ledges, resilient means holding said lugs to said locked position, said lugs being adapted to be moved against said resilient means to an unlocked position, upon assumption of driving relation by said second one way clutch.

11. A non-free-wheeling no-back overdrive gear set comprising, an input member, an output member, a planet pinion carrier, planet pinions on said carrier, a non-rotatable reaction gear in mesh with said planet pinions, a driven gear on the output member in mesh with said planet pinions, a one way clutch connecting the input member and output member, whereby the input member may drive the output member forwardly, a second one way clutch connecting the carrier and input member, whereby the carrier may drive the input member forwardly, centrifugal weights operable outwardly at a predetermined speed and carrying means engageable upon outward operation to connect the input member and carrier, whereby the input member may drive the carrier forwardly, ledges on said weights, locking lugs on one member of said second one way clutch, spring reaction lugs on said carrier, and springs between said spring reaction lugs and said locking lugs holding said locking lugs over said weight ledges, but adapted to yield and move said locking lugs away from over said weight ledges whenever said carrier drives said input member forwardly through said second one way clutch.

12. A non-free-wheeling no-back underdrive gear set comprising, an input member, an output member, a planet pinion carrier, planet pinions on said carrier, a non-rotatable reaction gear in mesh with said planet pinions, a driving gear on said input member in mesh with said planet pinions, a one way clutch connecting the carrier and output member, whereby the carrier may drive the output member forwardly, a second one way clutch connecting the output member and input member, whereby the output member may drive the input member forwardly, centrifugal weights operable outwardly at a predetermined speed and carrying means engageable upon outward operation to connect the input member and output member, whereby the input member may drive the output member forwardly, ledges on said weights, locking lugs on one member of said second one way clutch, spring reaction lugs on said output member, and springs between said spring reaction lugs and said locking lugs holding said locking lugs over said weight ledges, but adapted to yield and move said locking lugs away from over said weight ledges whenever said output member drives said input member forwardly through said second one way clutch.

13. A non-free-wheeling no-back overdrive gear set comprising, an input member, an output member, a planet pinion carrier, planet pinions on said carrier, a non-rotatable reaction gear in mesh with said pinions, a driven gear on the output member in mesh with said planet pinions, a one way clutch connecting the input member and output member, whereby the input member may drive the output member forwardly, a second one way clutch connecting the carrier and input member, whereby the carrier may drive the input member forwardly, centrifugal weights carried by the carrier operable outwardly at a predetermined speed and comprising means operative upon outward movement to engage means carried on the input member thereby to connect the input member and carrier, whereby the input member may drive the carrier forwardly, ledges on said weights, lugs on the inner member of said second one way clutch, spring reaction lugs on said carrier, and springs under stress between said spring reaction lugs and said locking lugs holding said locking lugs radially over said weight ledges, but adapted to yield and move said locking lugs away from over said weight ledges whenever said carrier drives said input member forwardly through said second one way clutch.

14. A non-free-wheeling no-back underdrive gear set comprising, an input member, an output member, a planet pinion carrier, planet pinions on said carrier, a non-rotatable reaction gear in mesh with said pinions, a driving gear on said input member in mesh with said planet pinions, a one way clutch connecting the carrier and output member, whereby the carrier may drive the output member forwardly, a second one way clutch connecting the output member and input member, whereby the output member may drive the input member forwardly, centrifugal weights, carried on the output member, operable outwardly at a predetermined speed and comprising means operative upon outward movement to engage means carried on the input member, thereby to connect said input member and output member, whereby the input member may drive the output member forwardly, ledges on said weights, lugs on the inner member of said second one way clutch, spring reaction lugs on said output member, and springs under stress between said spring reaction lugs and said locking lugs holding said locking lugs radially over said weight ledges, but adapted to yield and move said locking lugs away from over said weight ledges whenever said output member drives said input member forwardly through said second one way clutch.

15. A non-free-wheeling no-back underdrive-direct-overdrive gear set comprising, an input member, an output member, a planet pinion carrier, planet pinions on said carrier, a non-rotatable reaction gear in mesh with said pinions, a rotatable gear in mesh with said pinions, a one way clutch connecting the carrier and output member, whereby the carrier may drive the output member forwardly, a second one way clutch connecting the output member and rotatable gear, whereby the output member may drive the rotatable gear forwardly, a third one way clutch connecting the input member and rotatable gear, whereby the input member may said one way drive clutch and said gearing to release said lock.

23. An overdrive gear comprising, an input member, an output member, a carrier, planet pinions on said carrier, a nonrotatable reaction gear in mesh with said pinions, a gear on the output member in mesh with said pinions, clutch means through which the input member may drive the output member but the output member may overrun the input member, a second clutch means through which the carrier may drive the input member but the input member may overrun the carrier, a third clutch means, operable at a predetermined speed, through which the input member may drive the carrier, locking means holding said third clutch means inoperative, and torque responsive means associated with said second clutch means for releasing said locking means operated only when said input member speed becomes synchronous with that of the carrier and is being driven by said carrier through said second clutch means.

24. An overdrive gear comprising, an input member, an output member, a carrier, planet pinions on said carrier, a nonrotatable reaction gear in mesh with said pinions, a gear on the output member in mesh with said pinions, an overrunning clutch through which the input member may drive the output member, a second overrunning clutch through which the carrier may drive the input member, a speed responsive clutch through which the input member may drive the carrier, a lock for holding said speed responsive clutch inoperative, a yielding means associated with said second overrunning clutch, yieldable to torque load transmitted by said carrier to said input member through said second clutch, and means associated with said yieldable means operative to unlock said lock when said yieldable means yields to said torque load.

25. An overdrive gear comprising, an input member, an output member, a carrier, planet pinions on said carrier, a nonrotatable reaction gear in mesh with said pinions, a gear on the output member in mesh with said pinions, an overrunning clutch through which the input member may drive the output member, a second overrunning clutch through which the carrier may drive the input member, a centrifugal clutch means on the carrier operative to connect the carrier to the input member whereby the input member may drive the carrier, a lock to hold said centrifugal clutch inoperative, a yieldable drive between the carrier and one member of the second overrunning clutch yieldable when said carrier and said input members reach exactly the same speeds and said carrier drives said input member, and means operable by torque load carried through said yieldable means when said carrier is driving said input member and their speeds are synchronous to unlock said lock and permit said centrifugal clutch to become operative.

FREDERICK W. COTTERMAN.